US008700785B2

(12) United States Patent  
Hwang et al.

(10) Patent No.: US 8,700,785 B2  
(45) Date of Patent: Apr. 15, 2014

(54) SIP COMMUNICATION PROTOCOL

(75) Inventors: Shaw Hwa Hwang, Taipei (TW); Bing Chih Yao, Taipei (TW)

(73) Assignee: National Taipei University of Technology, Taipei (TW)

( * ) Notice: Subject to any disclaimer, the term of this patent is extended or adjusted under 35 U.S.C. 154(b) by 271 days.

(21) Appl. No.: 13/213,577

(22) Filed: Aug. 19, 2011

(65) Prior Publication Data

US 2013/0046897 A1 Feb. 21, 2013

(51) Int. Cl.
*G06F 15/16* (2006.01)

(52) U.S. Cl.
USPC ............................ 709/228; 709/227; 709/245

(58) Field of Classification Search
USPC .......................................... 709/227, 228, 245
See application file for complete search history.

(56) References Cited

U.S. PATENT DOCUMENTS

| 7,987,490 B2 | 7/2011 | Ansari et al. | |
| 8,204,066 B2 * | 6/2012 | Chen et al. | 370/401 |
| 2010/0182995 A1 * | 7/2010 | Hwang et al. | 370/352 |

* cited by examiner

*Primary Examiner* — Waseem Ashraf  
*Assistant Examiner* — Marie Georges Henry  
(74) *Attorney, Agent, or Firm* — Bacon & Thomas, PLLC

(57) ABSTRACT

The present invention provides an improved SIP communication protocol. An NAT (Network Address Translator) traversal method is added before the SIP communication protocol, i.e. a client to client (C2C) module function is added to improve the function of SIP communication protocol, so as to solve the problem that the RTP (Real-time Transport Protocol) packets cannot traverse NAT firewall to achieve C2C communication after SIP (Session Initiation Protocol) is ended in VoIP. The major content of the present invention is to conduct a plurality of detection before SIP communication protocol, so as to predict the allocation rules of the port number by the C2C module, and open the RTP channel for C2C.

1 Claim, 9 Drawing Sheets

SIP COMMUNICATION PROTOCOL

FIELD OF THE INVENTION

The present invention relates to an improvement of the NAT (Network Address Translator) traversal method, and more particularly to an NAT traversal method in Session Initiation Protocol (SIP) for improving the traverse of RTP multi-media voice packets after SIP under the NAT firewall.

BACKGROUND OF THE INVENTION

VoIP (Voice over Internet Protocol) is one of the popular communication technology. In VoIP, SIP (Session Initiation Protocol) defined by IETF is the most widely used protocol because of its simple structure, expandability and easy operation.

In the present SIP Internet environment, more and more users install NAT (Network Address Translator) servers, but NAT servers induce the communication failure for RTP voice packets after SIP messages.

Referring to FIG. 1, which shows the SIP (Session Initiation Protocol) network environment for VoIP, comprises NAT server 1, NAT server 2 and SIP proxy server 3. SIP proxy server 3 is responsible for conducting SIP, i.e. for registration, forwarding or redirection of the Internet extension 2178 and Internet extension 2167 (SIP client's terminals).

Internet extension 2178 (IP: 192.168.1.2) and Internet extension 2167 (IP: 192.168.1.3) are under Taiwan NAT server 1 (IP: 140.124.40.11) and USA NAT server 2 (IP: 163.21.34.55) respectively, voice packets must be transferred through RTP-relay in SIP proxy server 3, client to client (C2C) communication between Internet extension 2178 and Internet extension 2167 is impossible. When a plurality of client's terminals communicates through SIP proxy server 3 simultaneously, it is apparent that the communication efficiency will be reduced significantly.

Referring to FIG. 2, the communication between Taiwan Internet extension 2178 and USA Internet extension 2167 is described. Taiwan Internet extension 2178 firstly issues INVITE 2167 message, in which SDP (192.168.1.2:6000) represents the IP address of the Internet extension 2178 (please see "Introduction of the Session Initiation Protocol (SIP)" on page 9). INVITE 2167 message pass through Taiwan NAT server 1, SIP proxy server 3, USA NAT server 2 and reach USA Internet extension 2167, causing USA Internet extension 2167 issues 180 Ringing message to feed back; when USA Internet extension 2167 picks up the phone, a 200 OK message is generated, in which SDP (192.168.1.3:1200) represents the IP address of the USA Internet extension 2167 (please see "Introduction of the Session Initiation Protocol (SIP)" on page 9), and then feed back. According to SIP communication protocol, Internet extension 2178 and Internet extension 2167 will then transfer voice packets each other for communication, but because the IP addresses 192.168.1.2 and 192.168.1.3 of the Internet extension 2178 and Internet extension 2167 are virtual addresses, so actually the voice packets cannot transfer each other for communication.

There is an improvement as shown in FIG. 3. An RTP-Relay (Real Time Transport Protocol-Relay) 4 is added on the SIP proxy server 3, such that the SIP proxy server 3 can change the message SDP (192.168.1.2:6000) into SDP (202.145.2.1:1200), in which "202.145.2.1" is the actual IP address of RTP-Relay 4. Similarly, when USA Internet extension 2167 issues 200 OK message, the SIP proxy server 3 can change the message SDP(192.168.1.3:1200) into SDP (202.145.2.1:1201), in which "202.145.2.1" is the actual IP address of RTP-Relay 4. Since "202.145.2.1" is the actual IP address of RTP-Relay 4, the voice packets of the Internet extension 2178 and Internet extension 2167 can transfer each other through the actual IP address "202.145.2.1" for communication.

However, there is a disadvantage in RTP-Relay 4, the bandwidth for video communication of RTP-Relay 4 is 2 Mb/sec, so the expense for one month per user is NT$20,000. If there are 1 million users to communicate simultaneously, the expense of bandwidth for RTP-Relay 4 will be NT$20 billion/month, therefore this method is not useful.

SUMMARY OF THE INVENTION

The object of the present invention is to provide an improved SIP communication protocol. An NAT (Network Address Translator) traversal method is added before the SIP communication protocol, i.e. a client to client (C2C) module function is added to improve the function of SIP communication protocol, so as to achieve C2C communication after SIP (Session Initiation Protocol) is ended in VoIP. The major content of the present invention is to conduct a plurality of detection before SIP communication protocol, so as to predict the allocation rules of the port number by the C2C module, and open the RTP channel for C2C.

The improved SIP communication protocol includes a Login Session, a CallSetup Session, a Media Session and a Cancel Session; and comprises a first NAT server, a second NAT server and an SIP proxy server; a first Internet extension is under the first NAT server, a second Internet extension is under the second NAT server; each of the SIP proxy server, the first Internet extension and the second Internet extension has a C2C module; the improved SIP communication protocol performs the following traversal methods:

a. before an invite message is issued in the Login Session of SIP, the first Internet extension conducts a plurality of detections for detecting a regularity of port number allocated by the C2C module in the SIP proxy server;

b. after the plurality of detections the first Internet extension predicts a port number allocated by the C2C module in accordance with the regularity that the C2C module allocates the port number for transferring voice packets, and an IP of the first NAT server and the port number allocated to the first Internet extension for transferring voice packets are filled into an Invite message of the C2C module;

c. the invite message of the C2C module passes through the first NAT server to the SIP proxy server having the C2C module, and then pass through the second NAT server to the second Internet extension;

d. after the second Internet extension receives the invite message of the C2C module, the second Internet extension conducts a plurality of detections for detecting a regularity of port number allocated by the C2C module in the SIP proxy server;

e. after the plurality of detections the second Internet extension predicts a port number allocated by the C2C module of the SIP proxy server to the second Internet extension for transferring voice packets, the second Internet extension will fill an IP of the second NAT server and the port number allocated to the second Internet extension for transferring voice packets into a 200 OK message of the C2C module;

f. the second Internet extension passes the 200 OK message of the C2C module through the second NAT server to the SIP proxy server having the C2C module, and then pass through the first NAT server to the first Internet extension;

g. after the first Internet extension receives the 200 OK message of the C2C module, the first Internet extension and the second Internet extension begin to transfer "virtual" RTP media data each other; after both sides receive the "virtual" RTP media data of the opposite side, it means that a client to client RTP channel is established, therefore the C2C module will transfer allocated IP and the predicted port number to the first Internet extension and the second Internet extension for using in a following SDP in the SIP message;

h. and then enter the Login Session and the CallSetup Session of SIP, when enter into the Media Session, the IP allocated by the C2C module and the predicted port number will be used to achieve a client to client voice packets transfer directly.

DETAILED DESCRIPTION OF THE PREFERRED EMBODIMENTS

Introduction to SIP

A message is the basic unit for SIP to set up a voice communication. The message can be classified to a "request" and a "response". A request is an SIP message from a client to a server to express the purpose of the client; while a response is an SIP message from a server to a client to answer the request from the client.

SIP defines six request methods, including Invite Cancel Bye ACK Register and Option, as shown in table 1 below.

TABLE 1

Six basic requests in SIP

| requests | descriptions |
|---|---|
| Invite | To set up a new media session, or to alter the media characteristics of the present session (re-Invite); a message body often accompanies with the Invite request for describing/altering the media characteristics of the Invite. |
| Cancel | To cancel a session that is not set up yet (the final response is not received) to a server, and the server is under searching or ringing status. |
| Bye | To end up a successful session (the final response "2xx" has been received). A request terminal for Invite or a receiving terminal can issue such request. |
| ACK | A request that the client (issuing an Invite) confirms to the server that a final response is received. |

TABLE 1-continued

Six basic requests in SIP

| requests | descriptions |
|---|---|
| Register | SIP client issues a registering request to a server, and the server records the IP address and communication port of the client. |
| Option | Inquiring the support ability of the opposite side. |

An SIP response is a message from a server to a client to answer the request from the client, as shown in table 2 below.

TABLE 2

Classification of SIP responses

| code range | responses | descriptions |
|---|---|---|
| 100~199 (1xx) | Informational | The server has received a request, and the request is processed, but the request is not accepted yet. |
| 200~299 (2xx) | Success | The server accepts the request from the client. |
| 300~399 (3xx) | Redirection | The request message has to be redirected to another server, and the URL of the redirected server will be shown on the header of "Contact". |
| 400~499 (4xx) | Client Error | The request cannot be processed because of the fault of the client, such as the message is not identified, the media is not supported or no such person, . . . etc. According to the instructions from the response meassage, the client can issue a new request to retry. |
| 500~599 (5xx) | Server Error | The request message cannot be processed because of the fault of the server, but the client can issue the request message to other server for processing. |
| 600~699 (6xx) | Global Error | The request message cannot be processed because of the fault of the Internet environment, and the request message cannot be issued to other server for retry. |

Introduction of the Session Initiation Protocol

Figure 1:
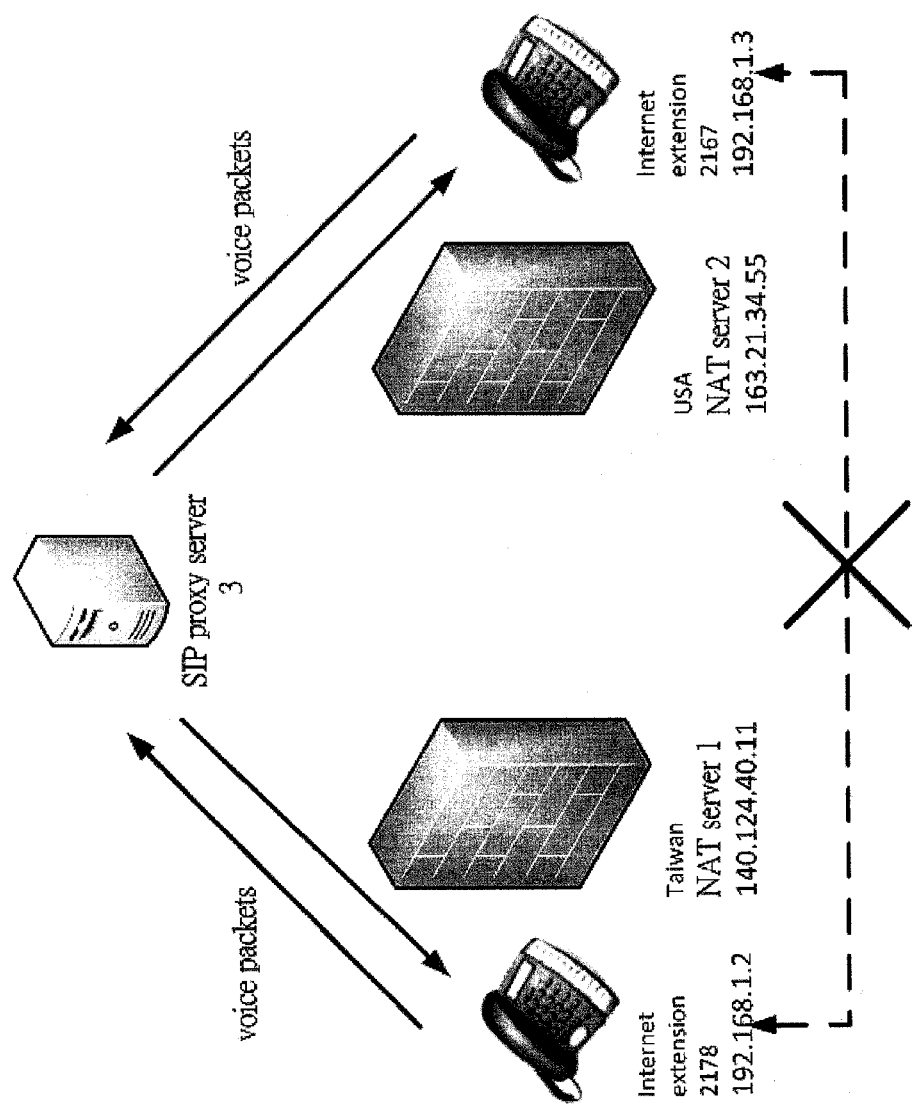
FIG. 1 shows the SIP (Session Initiation Protocol) network environment for VoIP.
Figure 2:
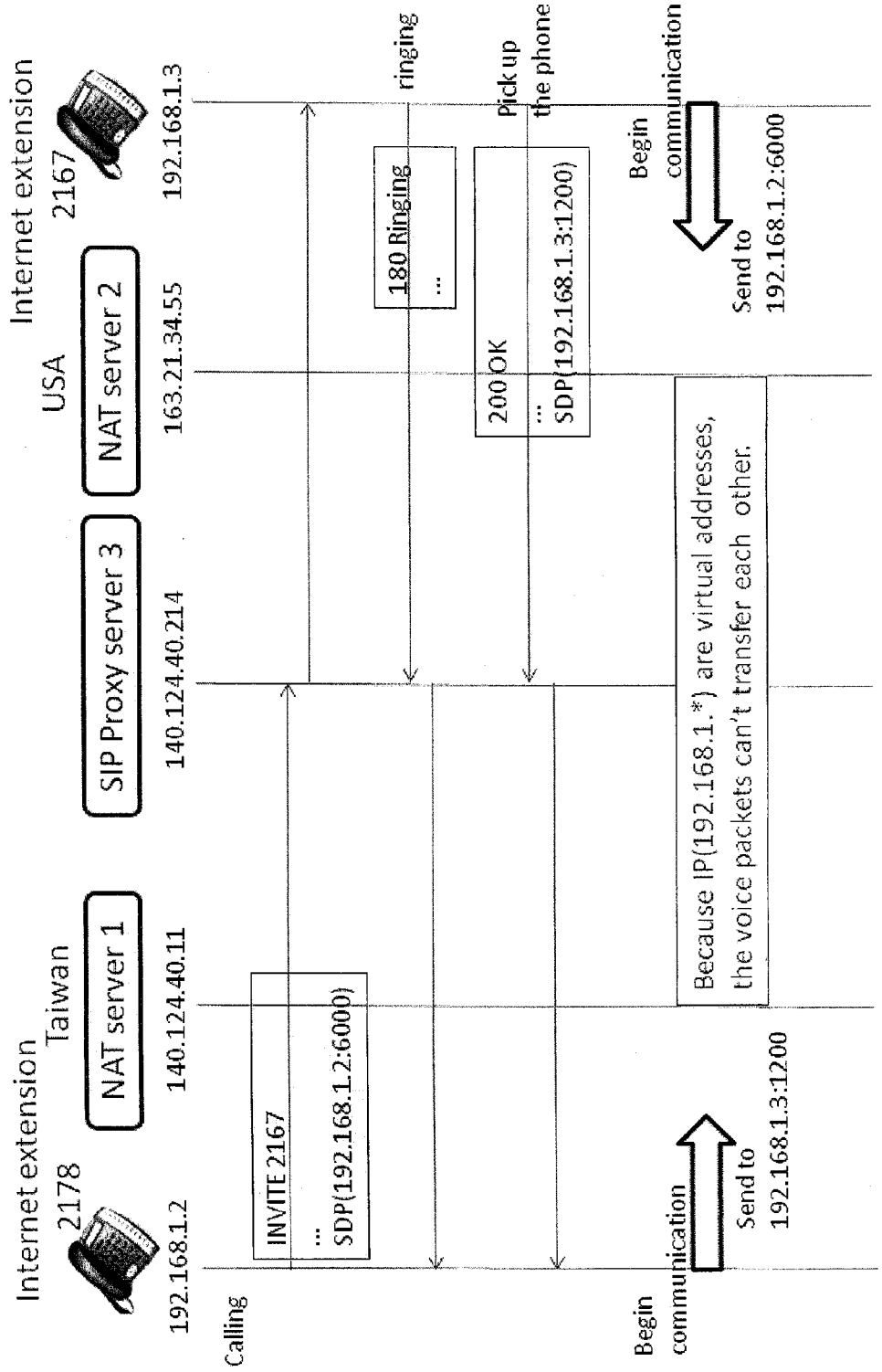
FIG. 2 shows the communication between Taiwan Internet extension and USA Internet extension.
Figure 3:
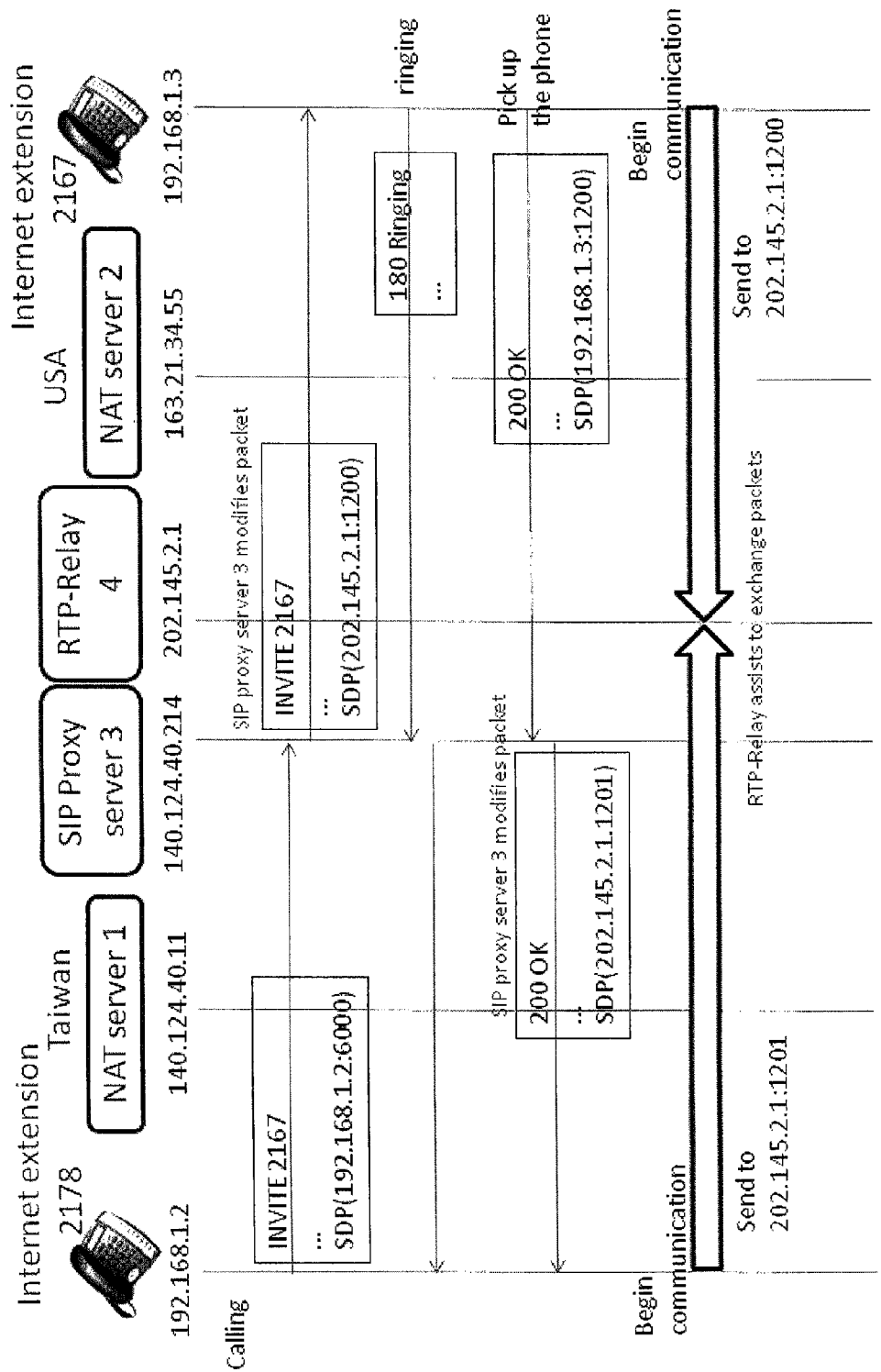
FIG. 3 shows an improvement of the communication between Taiwan Internet extension and USA Internet extension.
Figure 4:
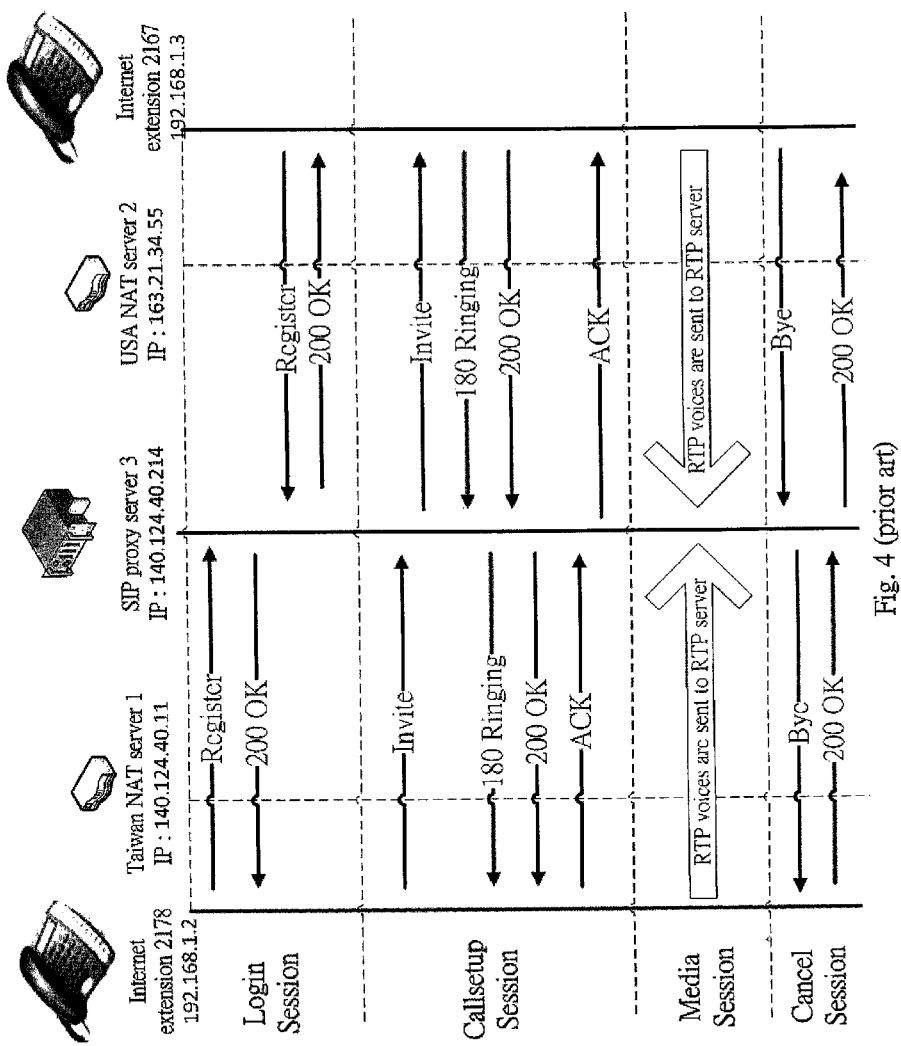
FIG. 4 shows the four sessions of the SIP communication protocol.

Referring to FIG. 4, the Session Initiation Protocol (SIP) includes Login Session, CallSetup Session, Media Session and Cancel Session. The Internet extension 2178 passes messages through NAT server 1 to the SIP proxy server 3, and then the SIP proxy server 3 passes messages through NAT server 2 to the Internet extension 2167

The first session is Login Session, the Internet extension 2178 registers at the SIP proxy server 3, the SIP proxy server 3 will return with a 200 OK message to mean success, then the Internet extension 2167 registers at the SIP proxy server 3, and will also return with a 200 OK message to mean success.

The next session is CallSetup Session, the Internet extension 2178 issues Invite message to pass through the SIP proxy server 3 and reach the Internet extension 2167, resulting 180 Ringing and 200 OK messages to be transferred back to the Internet extension 2178, the Internet extension 2178 issues ACK to the Internet extension 2167.

Thereafter the Internet extension 2178 and the Internet extension 2167 will enter Media Session to conduct communication (RTP Voice) through SIP proxy server 3.

After the communication is ended, the Internet extension 2167 and the Internet extension 2178 will issue BYE and 200 OK messages through the SIP proxy server 3 to stop communication.

In FIG. 4, the SIP proxy server 3 also performs the function of RTP (Real Time Transport Protocol) server. SIP proxy server 3 is usually responsible for transferring messages, while RTP server is responsible for transferring voice packets.

Figure 5:
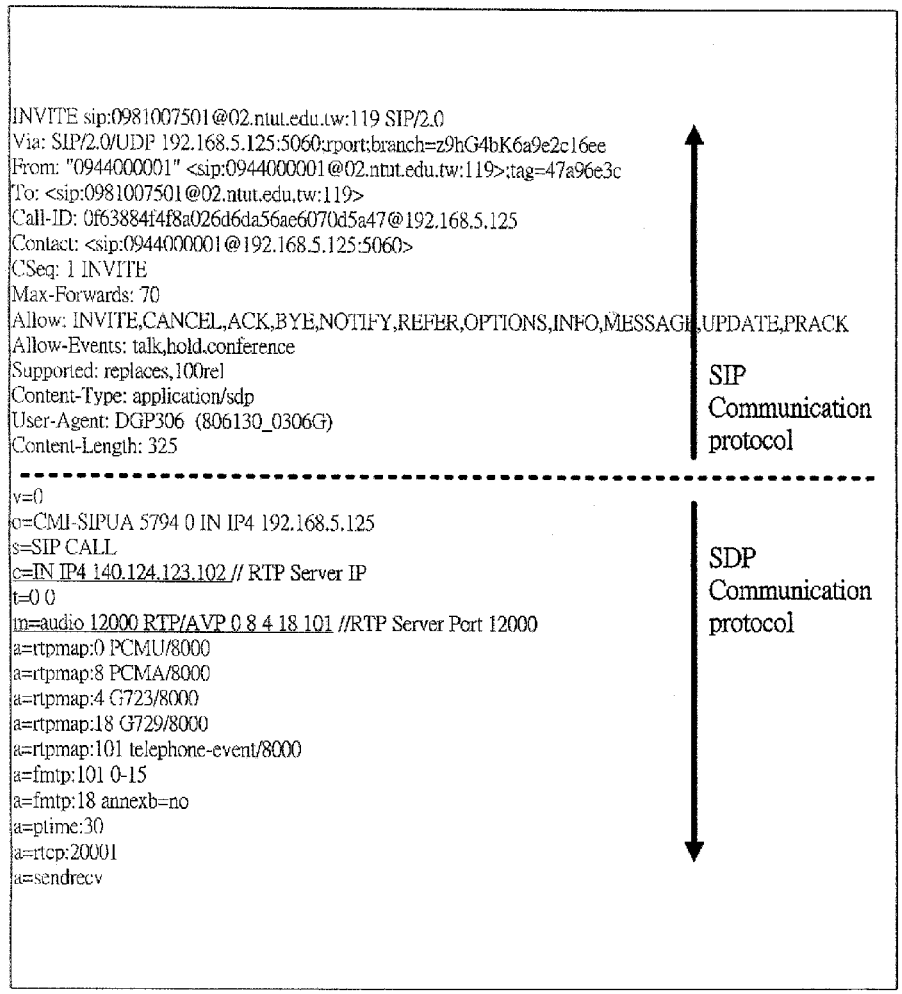
FIG. 5 shows schematically the separation of SIP and SDP.

The SIP includes Session Description Protocol (SDP). SDP comprises compressive and decompressive forms which are needed for transferring voice packets. In FIG. 5, SIP and SDP parts are separated apparently, "c" message in SDP represents IP of the source terminal for voice packet, "m" represents port number of the source terminal for voice packet.

Figure 6:
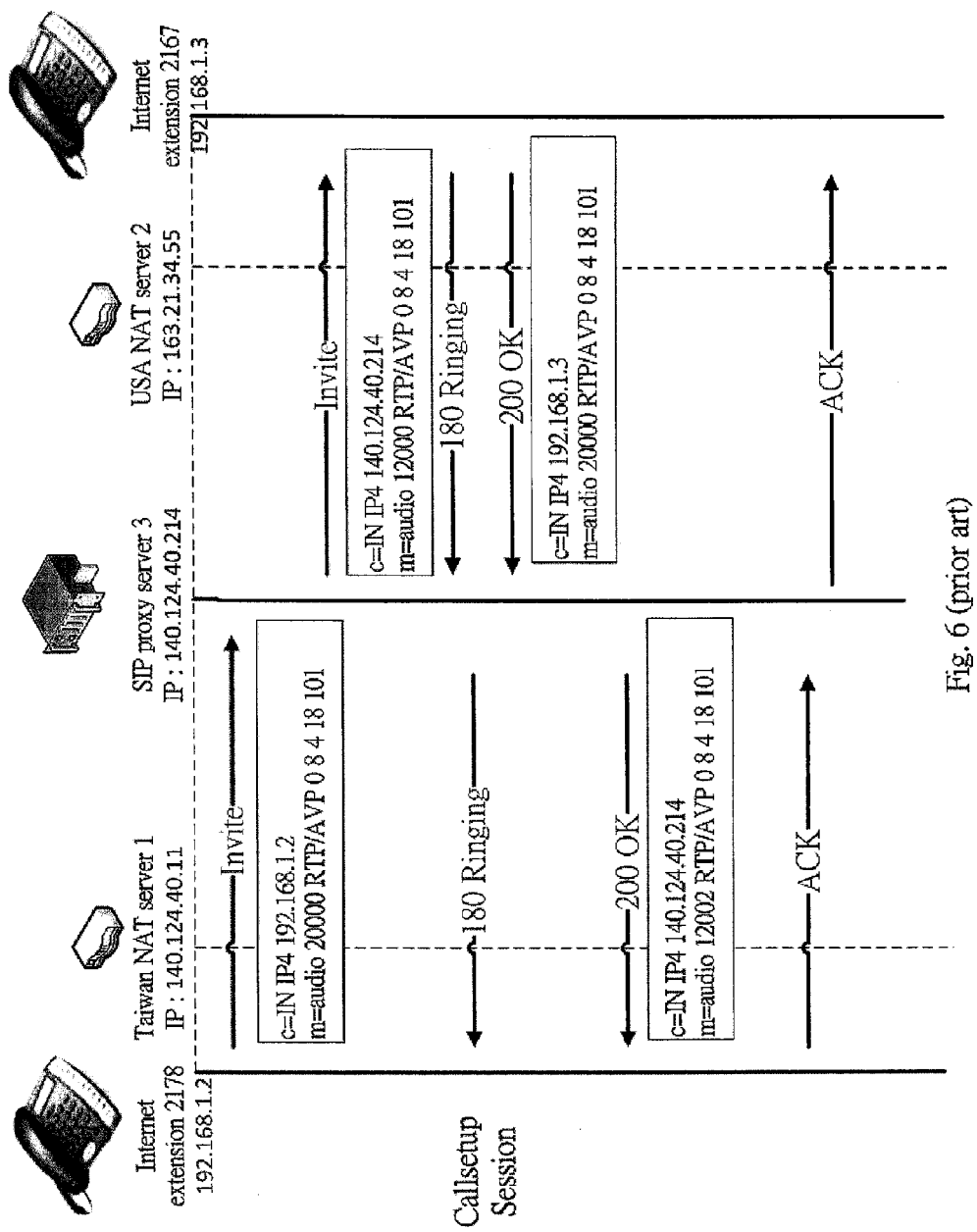
FIG. 6 shows the standard communication procedures in SIP.

Referring to FIG. 6, which is the procedure to set up communication in standard SIP. The Internet extension 2178 issues Invite message to SIP proxy server 3, Invite message comprises SDP messages as below:
   c=IN IP4 192.168.1.2
   m=audio 20000 RTP/AVP 0 8 4 18 101

After the Invite message passes through the SIP proxy server 3, it will be modified as:
   c=IN IP4 140.124.40.214
   m=audio 12000 RTP/AVP 0 8 4 18 101

The above messages will then pass through NAT server 2 to reach the Internet extension 2167. After the Internet extension 2167 receives the Invite message, it will return with "200 OK" message to the SIP proxy server 3. The 200 OK message comprises:
   c=IN IP4 192.168.1.3
   m=audio 20000 RTP/AVP 0 8 4 18 101

After the Internet extension 2167 receives the Invite message, it will then transfer voice packets to RTP server (i.e. SIP proxy server 3) with IP: 140.124.40.214 and port number 12000.

After the SIP proxy server 3 receives the 200 OK message, it will modifies "c" and "m" as:
   c=IN IP4 140.124.40.214
   m=audio 12002 RTP/AVP 0 8 4 18 101

And transfer to the Internet extension 2178 through NAT server 1. After the Internet extension 2178 receives the 200 OK message, it will transfer voice packets to RTP server (i.e. SIP proxy server 3) with IP: 140.124.40.214 and port number 12002. RTP server (i.e. SIP proxy server 3) receives voice packets from both sides, and transfer voice packets to the other side (enter into Media Session).

Improved SIP Communication Protocol

Figure 7:
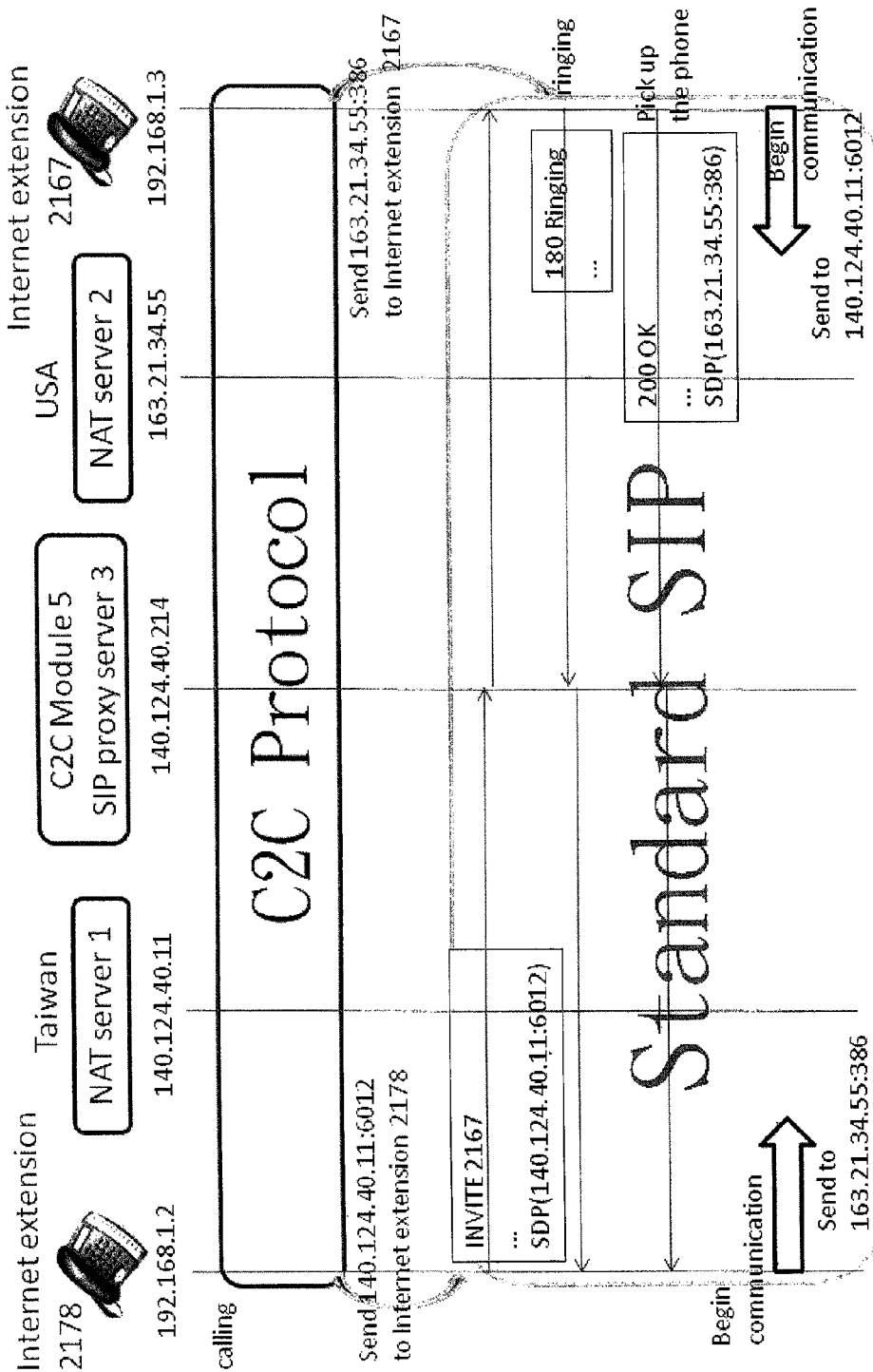
FIG. 7 shows that an NAT traversal method (i.e. client to client protocol, C2C protocol) is added before the SIP communication protocol according to the present invention.

FIG. 7 shows that an NAT traversal method (i.e. client to client protocol, C2C protocol) is added before the SIP communication protocol.

Figure 8:
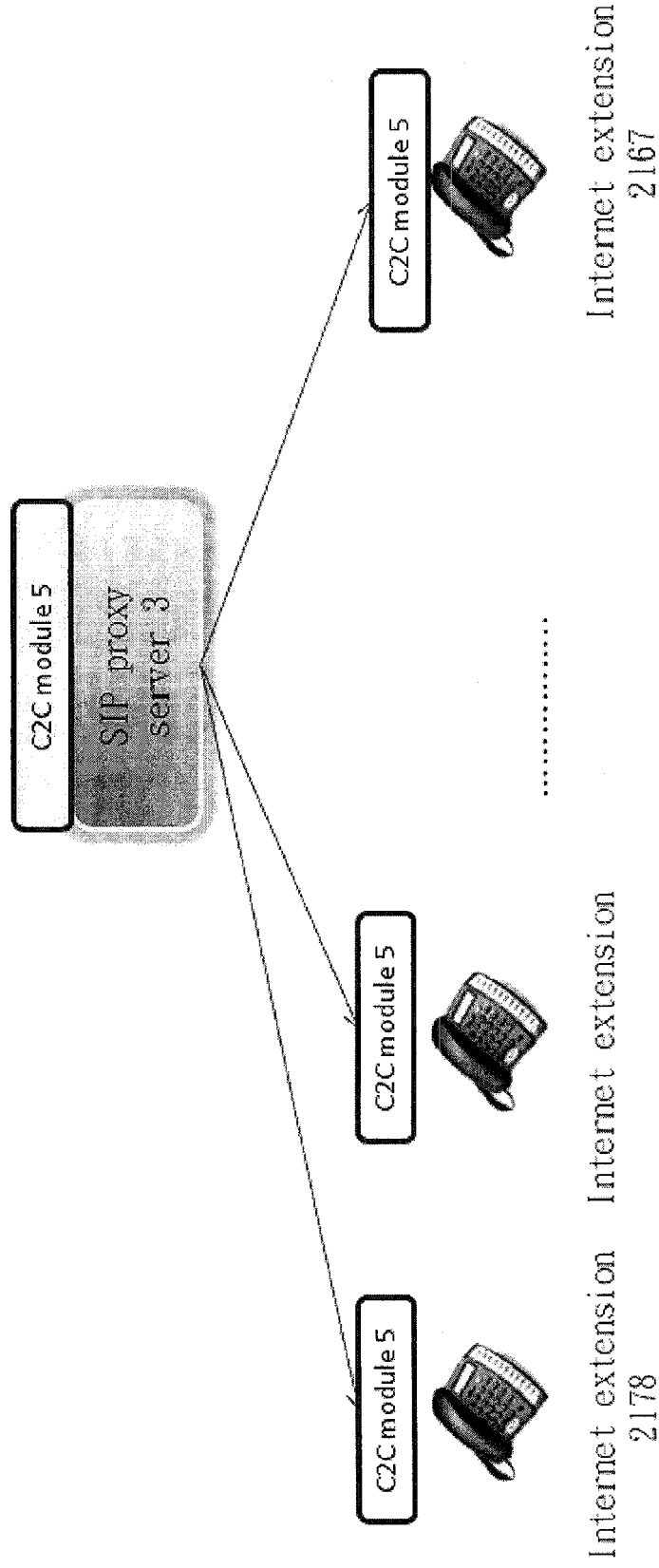
FIG. 8 shows the system architecture according to the present invention.

FIG. 8 shows the system architecture according to the present invention. A C2C module 5 is added respectively on each Internet extension and on the SIP proxy server 3 to implement the software of C2C protocol.

Figure 9:
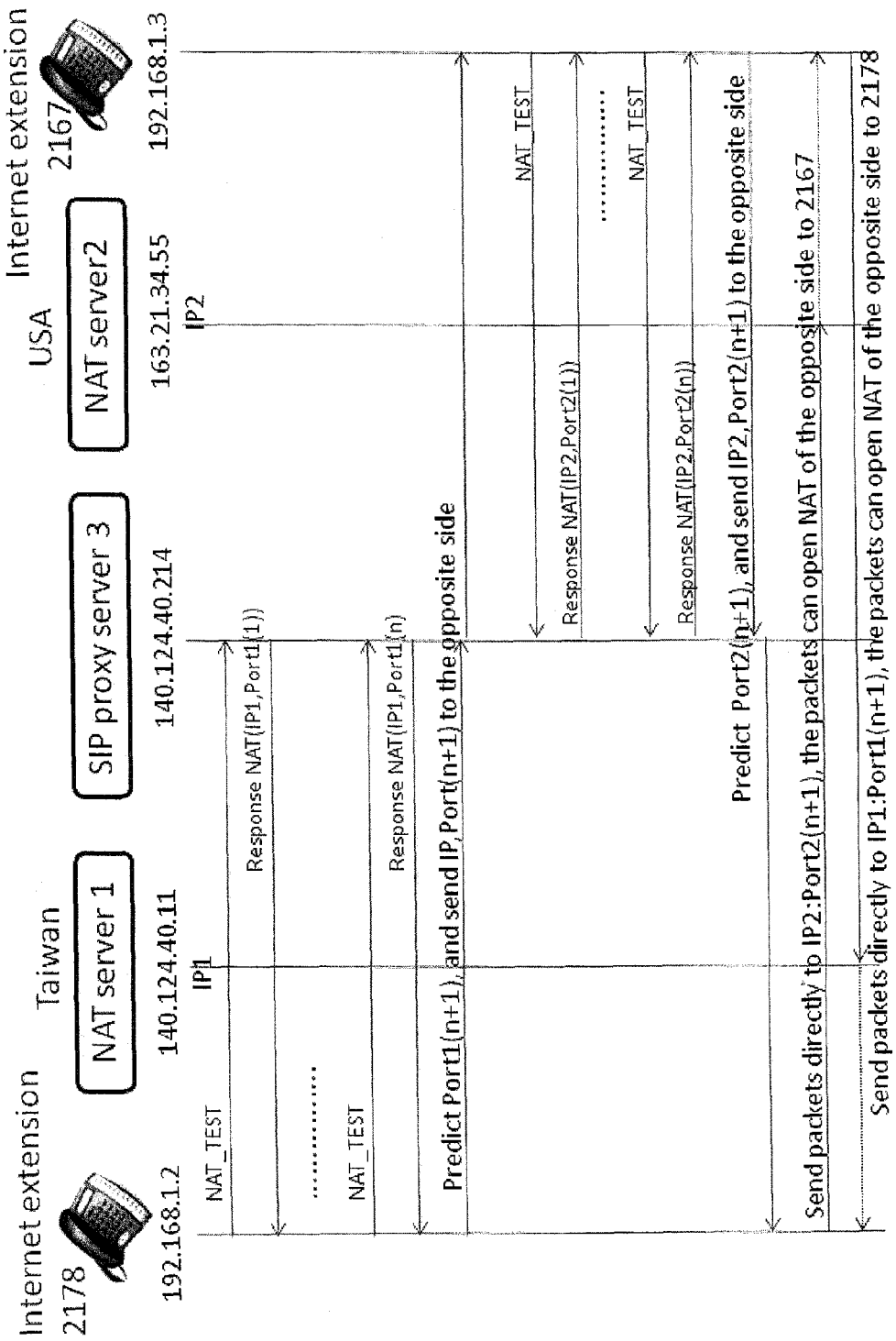
FIG. 9 describes C2C protocol according to the present invention.

FIG. 9 describes C2C protocol. Before the Internet extension 2178 issues Invite message during the Login Session in SIP communication protocol, a plurality of detecting procedure (NAT_TEST) are conducted N times for detecting the regularity of the communication port allocated by C2C module 5. After the N detecting procedures, the internet extension 2178 can predict the port number allocated by C2C module 5, and then transfer voice packets according to the regularity of the port number allocated by C2C module 5. IP1 (140.124.40.11) of the NAT server 1 and the port number Port 1(n+1) allocated to the Internet extension 2178 to transfer voice packets will be filled into the invite message of C2C protocol (similar to the message format of SDP):
   c=IN IP4 140.124.40.11
   m=audio Port 1(n+1) RTP/AVP 0 8 4 18 101

After the Internet extension 2167 receives the message, a plurality of detecting procedure (NAT_TEST) are conducted N times for detecting the regularity of the port number allocated by the C2C module 5. After the N detecting procedures, the internet extension 2167 can predict the port number allocated by the C2C module 5, and then transfer voice packets according to the regularity of the port number allocated by the C2C module 5. IP2 (163.21.34.55) of the NAT server 2 and the port number Port 2(n+1) allocated to the Internet extension 2167 to transfer voice packets will be filled by the Internet extension 2167 into the 200 OK message of the C2C protocol (similar to the message format of SDP):
   c=IN IP4 163.21.34.55
   m=audio Port 2(n+1) RTP/AVP 0 8 4 18 101

Thereafter the Internet extension 2167 transfers the 200 OK message of C2C protocol through NAT server 2 to C2C module 5, and then C2C module will transfer the 200 OK message of C2C protocol through NAT server 1 to the Internet extension 2178.

After the Internet extension 2178 receives the 200 OK message, both sides will traverse NAT to transfer a "virtual" RTP media data. After both sides receive the "virtual" RTP media data of the opposite sides, it means that a client to client RTP channel is established, therefore the C2C module will transfer parameter (140.124.40.11:6012) to Internet extension 2178, while transfer parameter (163.21.34.55:386) to Internet extension 2167, as shown in FIG. 7.

Thereafter the SDP information in SIP message just uses the IP and Port number allocated by the C2C module, and when the real Media Session begins for transferring voice packets, C2C voice packets transfer is achieved.

Before the real C2C voice packets transfer each other, the Login Session, CallSetup Session stated in *Introduction of the Session Initiation Protocol* have to be implemented. When the real Media Session begins, the IP and Port number allocated by the C2C module will be utilized to achieve C2C voice packets transfer.

The features of the improved SIP communication protocol according to the present invention are as below:
   1. Utilize NAT traversal method;
   2. Do not change SIP protocol;
   3. Do not change SIP proxy server;
   4. C2C modules are added;
   5. Traverse NAT directly without RTP-Relay.

The scope of the present invention depends upon the following claims, and is not limited by the above embodiments.

What is claimed is:

1. An improved Session Initiation Protocol (SIP) communication protocol, wherein the improved SIP communication protocol includes a Login Session, a CallSetup Session, a Media Session and a Cancel Session; and comprises a first Network Address Translator (NAT) server, a second NAT server and an SIP proxy server; a first Internet extension is under the first NAT server, a second Internet extension is under the second NAT server; each of the SIP proxy server, the first Internet extension and the second Internet extension has a client-to-client (C2C) module; the improved SIP communication protocol performs the following traversal methods:
   a. before an invite message is issued in the Login Session of SIP, the first Internet extension conducts a plurality of detections for detecting a regularity of port number allocated by the C2C module in the SIP proxy server;
   b. after the plurality of detections the first Internet extension predicts a port number allocated by the C2C module in accordance with the regularity that the C2C module allocates the port number for transferring voice packets, and an IP of the first NAT server and the port number allocated to the first Internet extension for transferring voice packets are filled into an Invite message of the C2C module;

c. the invite message of the C2C module passes through the first NAT server to the SIP proxy server having the C2C module, and then pass through the second NAT server to the second Internet extension;

d. after the second Internet extension receives the invite message of the C2C module, the second Internet extension conducts a plurality of detections for detecting a regularity of port number allocated by the C2C module in the SIP proxy server;

e. after the plurality of detections the second Internet extension predicts a port number allocated by the C2C module of the SIP proxy server to the second Internet extension for transferring voice packets, the second Internet extension will fill an IP of the second NAT server and the port number allocated to the second Internet extension for transferring voice packets into a 200 OK message of the C2C module;

f. the second Internet extension passes the 200 OK message of the C2C module through the second NAT server to the SIP proxy server having the C2C module, and then pass through the first NAT server to the first Internet extension;

g. after the first Internet extension receives the 200 OK message of the C2C module, the first Internet extension and the second Internet extension begin to transfer "virtual" RTP media data each other; after both sides receive the "virtual" RTP media data of the opposite side, it means that a client to client RTP channel is established, therefore the C2C module will transfer allocated IP and the predicted port number to the first Internet extension and the second Internet extension for using in a following Session Description Protocol (SDP) in the SIP message;

h. and then enter the Login Session and the CallSetup Session of SIP, when enter into the Media Session, the IP allocated by the C2C module and the predicted port number will be used to achieve a client to client voice packets transfer directly.

* * * * *